US005549845A

United States Patent [19]

Young

[11] Patent Number: 5,549,845

[45] Date of Patent: Aug. 27, 1996

[54] DISPERSIONS AND EMULSIONS COMPRISING A FATTY ACID ESTER TO REDUCE VISCOSITY

[75] Inventor: David J. Young, Chorleywood, United Kingdom

[73] Assignee: Eastman Kodak Company, Rochester, N.Y.

[21] Appl. No.: 975,588

[22] PCT Filed: Jul. 24, 1991

[86] PCT No.: PCT/EP91/01378

§ 371 Date: Jan. 21, 1993

§ 102(e) Date: Jan. 21, 1993

[87] PCT Pub. No.: WO92/01971

PCT Pub. Date: Feb. 6, 1992

[30] Foreign Application Priority Data

Jul. 26, 1990 [GB] United Kingdom .................. 9016473

[51] Int. Cl.[6] .............................. B01J 13/00; G03C 1/76

[52] U.S. Cl. ......................... 252/312; 252/311; 430/539; 430/546; 106/156.21

[58] Field of Search .................................... 430/546, 539; 252/356, 312, 340, 311, 351; 106/131, 135

[56] References Cited

U.S. PATENT DOCUMENTS

| | | | |
|---|---|---|---|
| 2,401,718 | 6/1946 | Young . | |
| 3,617,292 | 11/1971 | Gantz | 106/125 |
| 3,762,928 | 10/1973 | Williems | 430/634 |
| 3,912,517 | 10/1975 | Van Poucke et al. | 430/546 |

FOREIGN PATENT DOCUMENTS

| | | |
|---|---|---|
| 1173540 | 2/1959 | France . |
| 1313700 | 11/1962 | France . |
| 59-072410 | 4/1984 | Japan . |
| 1038029 | 8/1966 | United Kingdom . |

*Primary Examiner*—John S. Y. Chu
*Attorney, Agent, or Firm*—Andrew J. Anderson

[57] ABSTRACT

An emulsion or dispersion in which the continuous phase is aqueous and comprises gelatin wherein its viscosity has been reduced by addition thereto of a water-soluble protein or a surfactant which is an ester of a polyalkoxylate.

2 Claims, 4 Drawing Sheets

DISPERSIONS AND EMULSIONS COMPRISING A FATTY ACID ESTER TO REDUCE VISCOSITY

Figure 1:
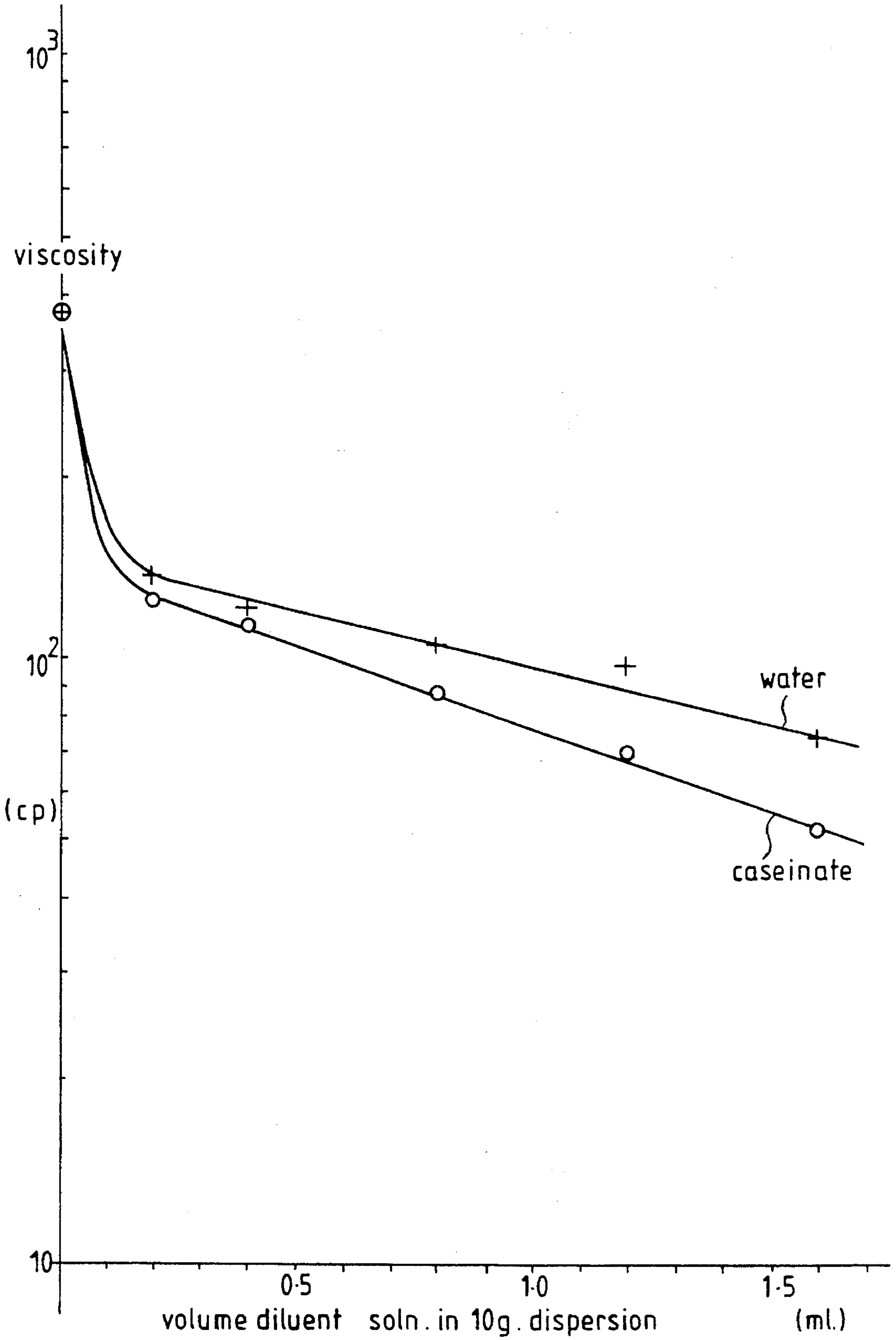

This invention relates to dispersions and emulsions and, in particular, to those in which the continuous phase comprises aqueous gelatin.

The abstract of JP-A-59-072 410 describes a negative photoresist solution comprising gelatin as binder which has its viscosity and gel temperature lowered by the addition of 20 to 70 wt. % casein. Such a solution does not contain solid particles or any discontinuous liquid phase.

Photosensitive photographic silver halide materials contain silver halide/gelatin emulsions and, in many colour materials, also contain dispersions of droplets of colour couplers in high boiling coupler solvents in a continuous aqueous gelatin phase. In fact the terms emulsion and dispersion are used erroneously interchanged but their nature is well understood by the photographic chemist.

There are a number of factors which tend to increase the viscosity of such emulsions and dispersions. This often leads to undesirable effects, especially when coupled with the phenomenon of shear thinning which can occur when dispersions and emulsions are mixed, pumped or emerge from coating hoppers. Non-uniform coatings can be due to such phenomena. The present emphasis on thin layers can aggravate these problems.

Accordingly the present invention provides a means for reducing the viscosity of such emulsions and dispersions.

According to the present invention there is provided an emulsion or dispersion in which the continuous phase is aqueous and comprises gelatin wherein the viscosity of the emulsion or dispersion has been reduced by addition thereto of a water-soluble protein at a concentration of from 0.01 to 10% or a surfactant which is an ester of a polyalkoxylate.

The water-soluble protein may, for example, be casein or a caseinate salt, α-lactalbumin, β-lactoglobulin, ovalbumin or conalbumin. The surfactant is preferably an ester of a polyethoxylate, especially a carboxylic ester and particularly a fatty acid ester thereof. The polyalkoxy moiety may contain 4 to 30 alkoxy units which are typically derived from ethoxy or glycidyl units. Examples of suitable fatty acids are stearic, lauric, palmitic and oleic acid. Specifically the surfactant may, for example, be from the commercially available TWEEN™ (Honeywell Atlas), CRILLET™ (Croda), or ARMOTAN™ (Akzo) ranges.

The addition may be made to the emulsion or dispersion before, during or after its initial formation. Preferably the addition is made as an aqueous solution of the material. The amount added is preferably from 0.1–5% and especially from 1–2%.

The emulsions may be any photographic silver halide emulsions. For example they may be any of those emulsions mentioned in Research Disclosure, December 1978, Item 17643, published by Kenneth Mason Publications Ltd., 12a North Street, Emsworth, Hants PO10 7DQ, U.K.

The dispersions may have a discontinuous phase comprising a high boiling coupler solvent and a photographic colour coupler. Information on such couplers and on methods for their dispersions are given in Sections VII and XIV, respectively, of the above Research Disclosure article.

The invention is illustrated in the following Examples. The Couplers used in the Examples are as follows:

COUPLER (A)

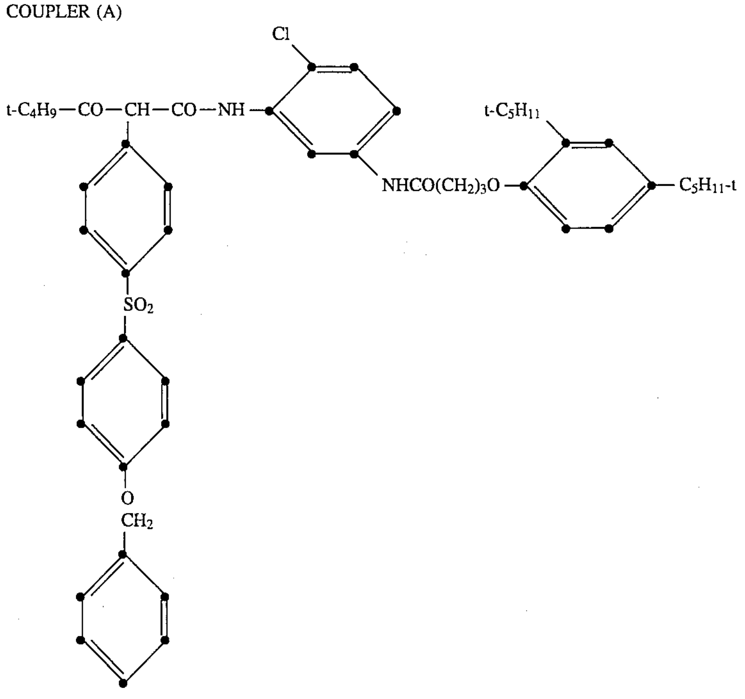

COUPLER (B)

-continued

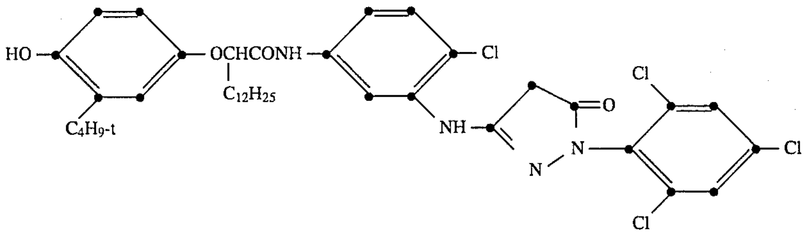

COUPLER (C)

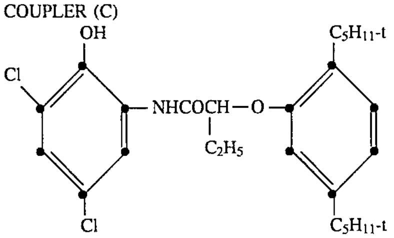

COUPLER (D)

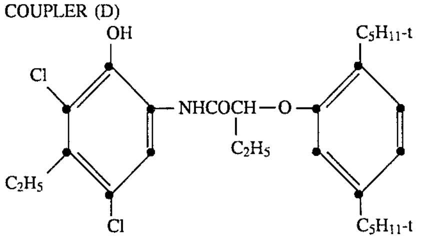

EXAMPLE 1

To 10 g Samples of the following photographic coupler dispersion:

| | |
|---|---|
| OIL | |
| Coupler (A) | 151 g |
| Dibutyl phthalate | 38 g |
| 2-(2-butoxyethoxy)ethyl acetate | 11 g |
| GEL | |
| Dry gelatin | 91 g |
| Water | 638 ml |
| 10% ALKANOL XC ™ | 60.5 g |
| 2N Propionic Acid | 8 ml. |
| 2N sodium hydroxide | 2.4 ml |

formed by adding the oil solution to the gelatin solution and mechanically dispersing it therein, were added a range of volumes of a 10% solution of sodium caseinate solution. After standing for not less than 15 minutes the viscosities were measured on a BROOKFIELD LVT™ microviscometer. A similar series was prepared in which the dispersion was diluted with water only. The results are given in FIG. 1 of the accompanying drawings and show that caseinate solution lowers the viscosity much more than the control additions of water.

EXAMPLE 2

The procedure described in Example 1 was repeated with the following dispersion of a photographic colour coupler:

| | |
|---|---|
| OIL | |
| Coupler (B) | 87.4 g |
| Dibutyl phthalate | 44 g |
| 2-(2-butoxyethoxy)ethyl acetate | 13 g |
| Dioctylhydroquinone | 8 g |
| 2,2-dimethyl-4-isopropyl-6-hydroxy-7-octyl-chroman | 37 g |
| GEL | |
| Dry gelatin | 87.4 g |
| Water | 612 ml |
| 2N Propionic acid | 5.1 ml |
| 2N NaOH | 9.1 ml |
| 10% ALKANOL XC ™ | 96.2 ml |

Figure 2:
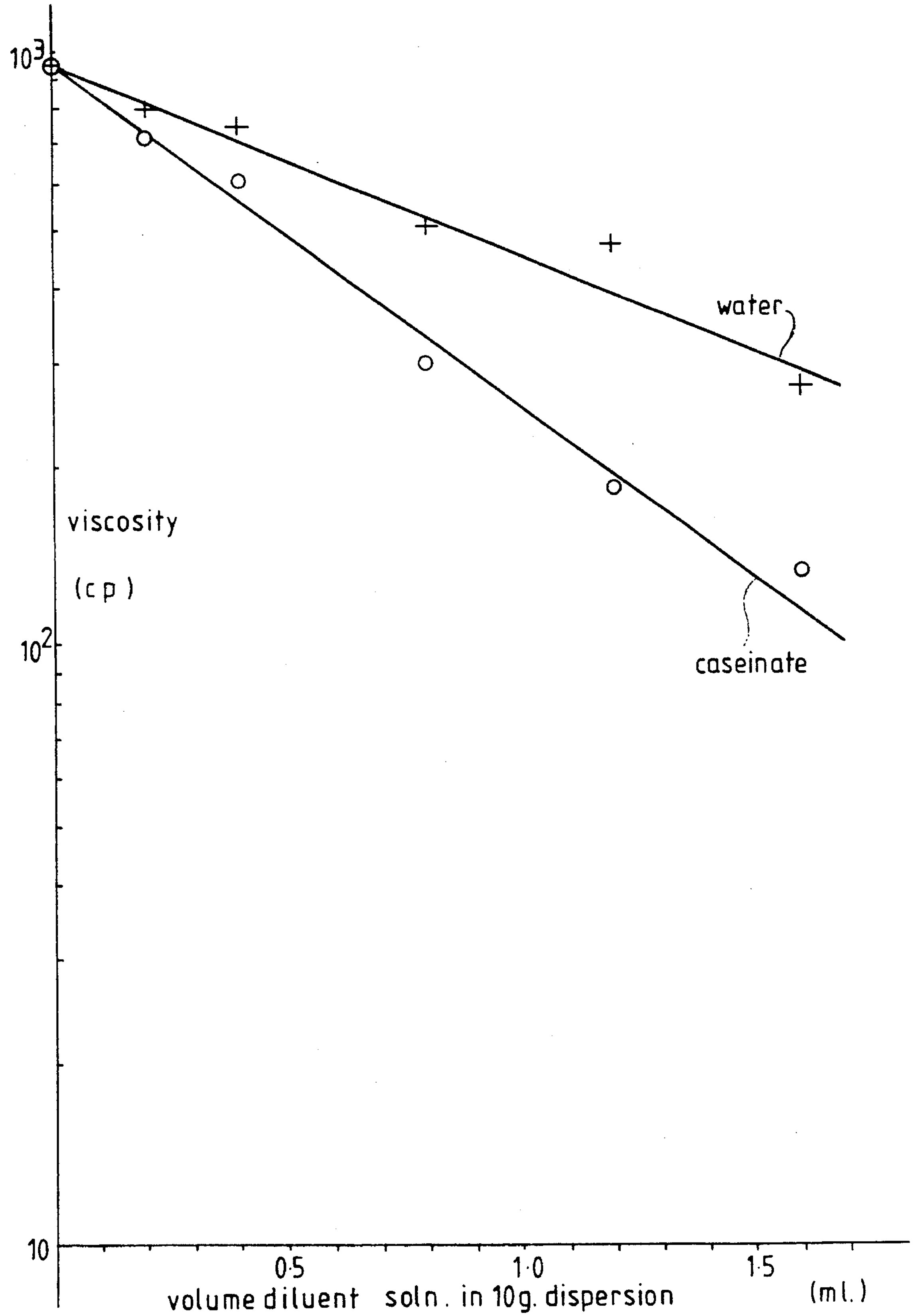

The results are given in FIG. 2 of the accompanying drawings and show that caseinate solution lowers the viscosity much more than the control additions of water.

EXAMPLE 3

The procedure described in Example 1 was repeated with the following dispersion of a photographic colour coupler:

| | |
|---|---|
| OIL | |
| Coupler (C) | 100 g |
| Dibutyl phthalate | 54 g |
| 2-(2-butoxyethoxy)ethyl acetate | 8 g |
| Dioctylhydroquinone | 8 g |
| GEL | |
| Dry gelatin | 99 g |
| Water | 698 ml |
| 2N Propionic acid | 11 ml |
| 2N NaOH | 5 ml |
| 10% ALKANOL XC ™ | 35 ml |

Figure 3:
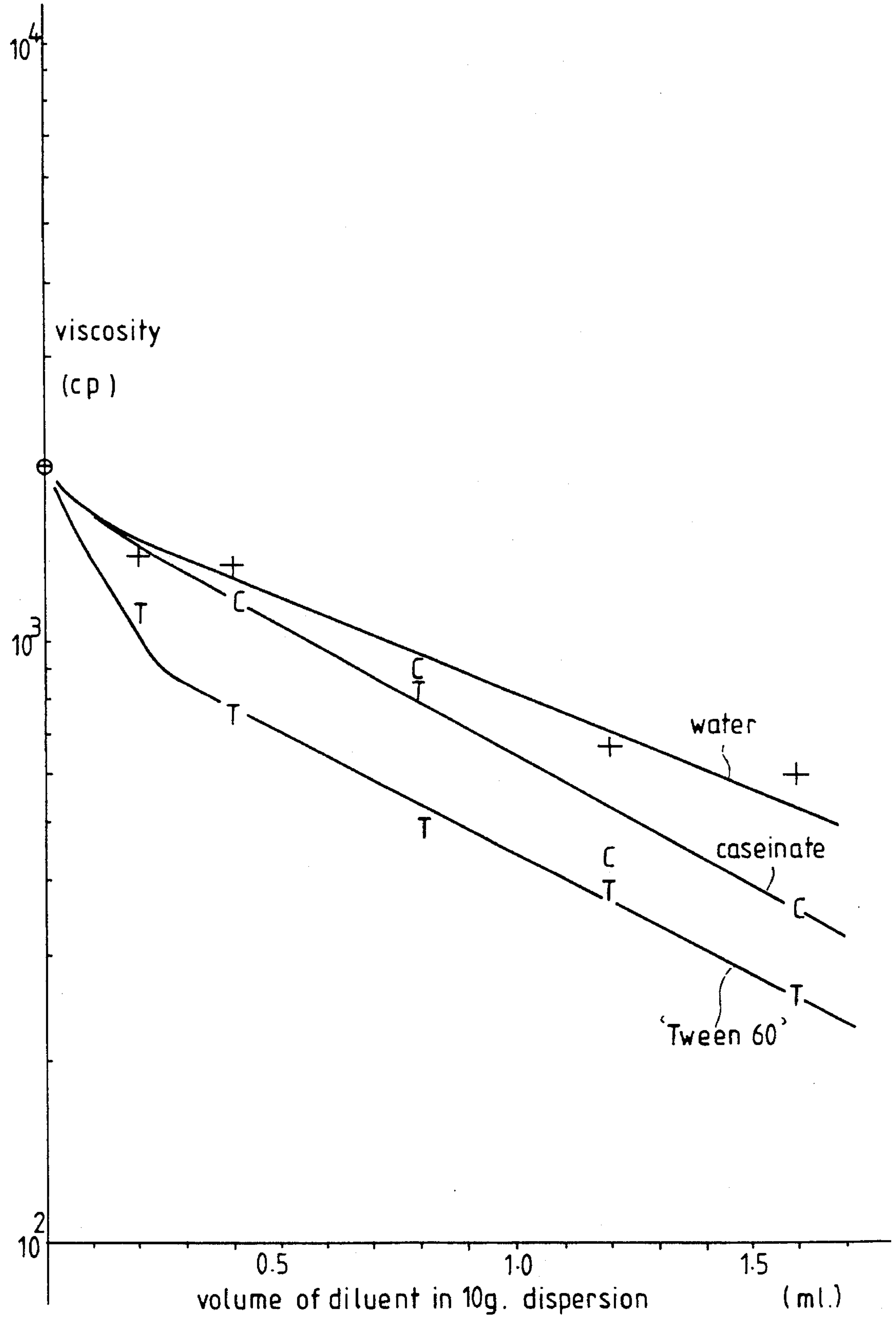

The results are given in FIG. 3 of the accompanying drawings and show that caseinate solution lowers the viscosity much more than the control additions of water.

EXAMPLE 4

Samples of the dispersion described in Example 3 were mixed with a range of weights of a 10% solution of TWEEN 60™ (a polyoxyethylene monostearate having 20 oxyethylene residues in the molecule). The results are shown as an additional line on FIG. 3 in which it can be seen that its viscosity-reducing effects are greater than that of sodium caseinate in Example 3.

EXAMPLE 5

To 1.0 g of Coupler (D) was added 0.5 g of a UV absober of the formula:

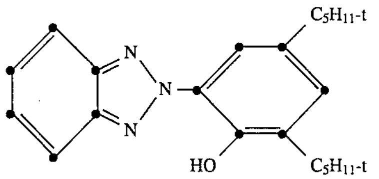

U1

0.5 g di-n-butyl phthalate, and 0.5 g of the surfactant PETRONATE L™. These components were dissolved together by heating and stirring, and the resulting oily solution was mechanically dispersed into 8.0 g of 7.8% w/w aqueous gelatin solution.

Figure 4:
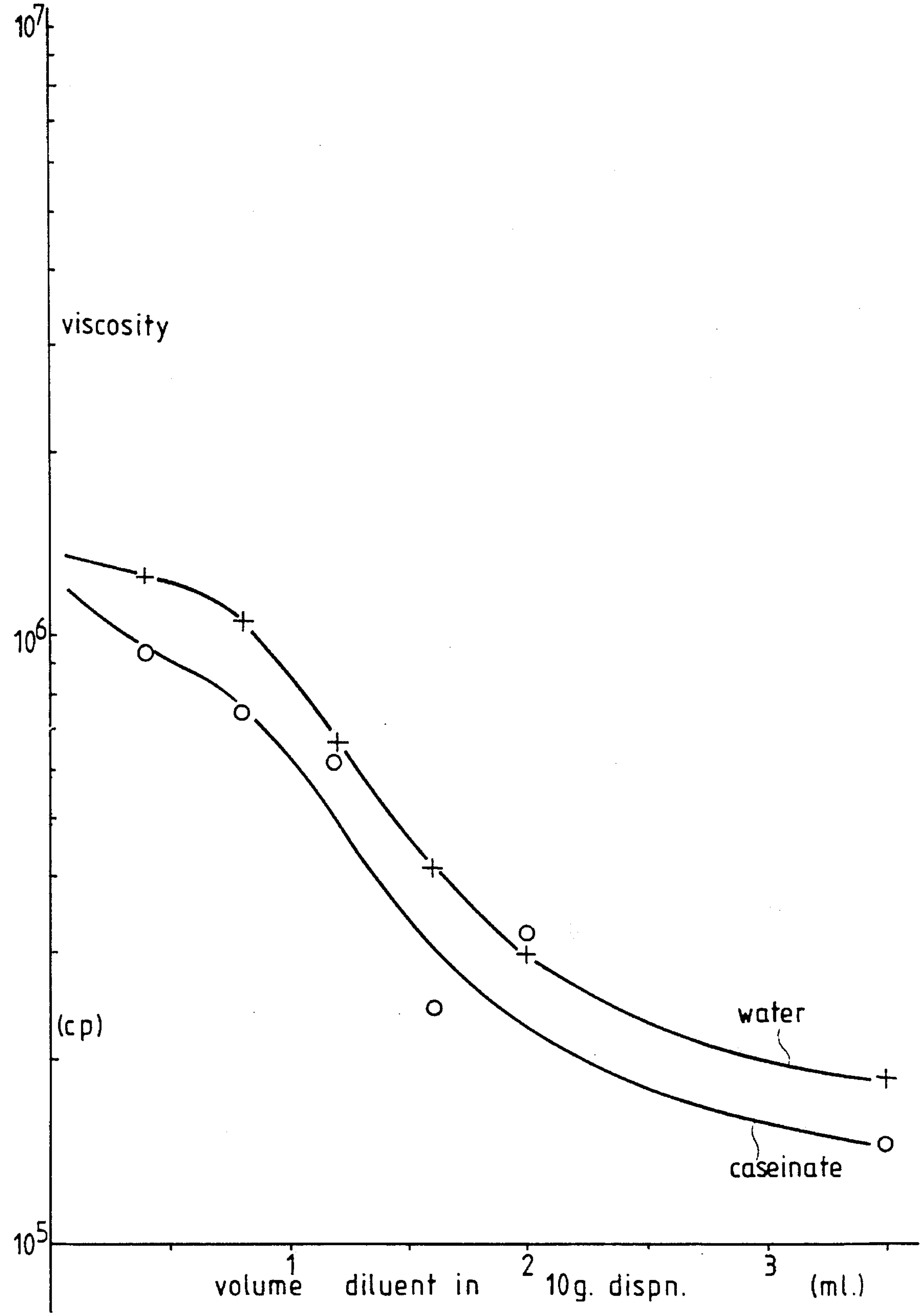

Caseinate solutions were added to 10 g samples of the above dispersion as in Examples 1–3 and the results are shown in FIG. 4. Again, the caseinate solution reduces the viscosity more than the comparative water additions.

I claim:

1. An emulsion or dispersion comprising a continuous phase comprising an aqueous solution of gelatin and a discontinuous phase comprising a water-immiscible solid or liquid, wherein the viscosity of said emulsion or dispersion has been reduced by addition thereto of a surfactant which is a fatty acid ester of a polyethoxylate at a concentration of from 1 to 2%.

2. An emulsion or dispersion according to claim 1, wherein the fatty acid part to the ester is derived from stearic, lauric, palmitic or oleic acid.

* * * * *